United States Patent
Harberts et al.

(10) Patent No.: US 7,695,038 B2
(45) Date of Patent: Apr. 13, 2010

(54) VEHICLE ACCESSORY ATTACHMENT CLIP

(75) Inventors: John H. Harberts, Macomb, MI (US); David W. Raffler, Shelby Township, MI (US); Daniel B. Fleming, Emmett, MI (US)

(73) Assignee: Ford Motor Company, Dearborn, MI (US)

( * ) Notice: Subject to any disclaimer, the term of this patent is extended or adjusted under 35 U.S.C. 154(b) by 315 days.

(21) Appl. No.: 11/813,705

(22) PCT Filed: Mar. 22, 2007

(86) PCT No.: PCT/IB2007/051017

§ 371 (c)(1), (2), (4) Date: Jul. 11, 2007

(87) PCT Pub. No.: WO2007/107968

PCT Pub. Date: Sep. 27, 2007

(65) Prior Publication Data

US 2009/0102241 A1 Apr. 23, 2009

Related U.S. Application Data

(60) Provisional application No. 60/784,738, filed on Mar. 22, 2006.

(51) Int. Cl.
*B60J 9/00* (2006.01)

(52) U.S. Cl. .................... 296/1.08; 296/210

(58) Field of Classification Search ............... 296/1.08, 296/210, 213, 1.07, 154, 37.7; 224/309, 224/322, 326
See application file for complete search history.

(56) References Cited

U.S. PATENT DOCUMENTS

| 5,013,083 | A | * | 5/1991 | Yada et al. | 296/213 |
|---|---|---|---|---|---|
| 5,636,776 | A | * | 6/1997 | Rak et al. | 224/322 |
| 5,636,954 | A | * | 6/1997 | Henderson et al. | 411/84 |
| 5,975,391 | A | * | 11/1999 | Aftanas et al. | 224/309 |
| 6,311,882 | B1 | | 11/2001 | Allison et al. | |
| 6,485,589 | B1 | | 11/2002 | Johnson et al. | |
| 6,557,931 | B1 | * | 5/2003 | Tremmel et al. | 296/213 |
| 6,564,433 | B2 | * | 5/2003 | Nagasawa | 24/297 |

(Continued)

FOREIGN PATENT DOCUMENTS

DE 3626926 2/1988

(Continued)

OTHER PUBLICATIONS

International Search Report for PCT/IB2007/051017.

(Continued)

*Primary Examiner*—Kiran B. Patel
(74) *Attorney, Agent, or Firm*—Greg Brown; Ford Global Technologies, LLC

(57) ABSTRACT

A ditch cover assembly, an accessory attachment clip, and an interchangeable roof accessory system for a vehicle are disclosed. An accessory attachment clip may generally include an elongated body having a first end, a second end, and a mid-portion disposed between the first and second ends, at least one securement mechanism disposed along the body for retaining an accessory, and at least one aperture disposed between the first end and the second end operable to receive a fastener to secure the body to the vehicle.

9 Claims, 7 Drawing Sheets

U.S. PATENT DOCUMENTS

| | | | |
|---|---|---|---|
| 6,568,748 B2 * | 5/2003 | Yoon | 296/210 |
| 6,974,181 B2 * | 12/2005 | Mikkaichi et al. | 296/210 |
| 7,004,537 B2 * | 2/2006 | Unger et al. | 296/210 |
| 7,029,060 B1 * | 4/2006 | Osterberg et al. | 296/203.03 |
| 2002/0037389 A1 * | 3/2002 | Miyano et al. | 428/99 |
| 2005/0189792 A1 | 9/2005 | Unger et al. | |
| 2007/0158965 A1 * | 7/2007 | Van Smirren | 296/3 |
| 2009/0021053 A1 * | 1/2009 | Harberts et al. | 296/213 |
| 2009/0188198 A1 * | 7/2009 | Scroggie et al. | 52/716.7 |

FOREIGN PATENT DOCUMENTS

| | | |
|---|---|---|
| DE | 19919852 | 11/2000 |
| EP | 1153797 | 11/2001 |
| JP | 62283032 | 8/1987 |

OTHER PUBLICATIONS

English abstract provided for DE-3626926.
English abstract provided for JP-62283032.

* cited by examiner

VEHICLE ACCESSORY ATTACHMENT CLIP

This application is a National Phase application claiming the benefit of International Application No.: PCT/IB2007/051017, filed Mar. 22, 2007, which claims priority based on U.S. Provisional Patent Application No. 60/784,738, filed Mar. 22, 2006, which is incorporated herein by referenced in its entirety.

BACKGROUND

Motor vehicles may be provided with roof ditches for preventing water, which accumulates on the roof from running into the interior of the vehicle through door openings, or onto occupants entering or alighting from the vehicle. A roof ditch generally includes a channel which guides the flow of water off of the vehicle roof. Typically, roof ditches are formed in sheetmetal panels of the upper greenhouse area of the vehicle. For example, roof ditches may be stamped in a roof panel. Roof ditches typically run along the length of the vehicle greenhouse area, such that any water or other liquid running into the ditches will tend to run off at the front or rear of the vehicle greenhouse area, away from vehicle door openings. Accordingly, roof ditches generally prevent spillage of water into the vehicle compartment or onto vehicle occupants. Additionally, roof ditches may provide aesthetic qualities to a vehicle roofline, or improve overall stiffness of a vehicle roof structure, such as where a roof ditch is stamped into a roof panel, generally increasing stiffness of the panel.

Vehicle accessories may be attached to the vehicle within or in the general vicinity of vehicle roof ditches using robust mounting features that can tolerate the load requirements typical of a vehicle accessory rack. For example, it may be convenient to secure accessory racks to the vehicle surface within a roof ditch, as the depth of the roof ditch generally provides a recessed mounting surface for the accessory rack. Further, mounting accessory racks to surfaces or features provided within the roof ditch generally reduces visual clutter on the roof of the vehicle.

Ditch moldings may be employed as aesthetic components of a vehicle by generally concealing roof ditches or providing a color in the vehicle roofline that contrasts with a vehicle body color, especially where the vehicle is not provided with accessories already secured to the roof ditch. Ditch moldings may also cover various features formed within a roof ditch, such as attachment features for vehicle accessories that would otherwise be attached to the roof ditch. This is especially useful where vehicles are produced in a mass manufacturing environment, with some vehicles receiving accessory racks and others receiving roof ditch moldings. However, ditch moldings generally do not require the more rugged, permanent mounting features typical of many accessory racks, since load requirements are lower for roof ditch moldings. Further, it is generally preferable to employ simpler snap-in fasteners enabling installation of ditch moldings by hand, and/or allow easy removal of the roof ditch molding.

Assembly of a vehicle having more rugged, durable features, e.g., an accessory rack, installed in some versions, and a simpler feature requiring less load-carrying ability, e.g., a roof ditch molding, installed in other versions, therefore generally necessitates separate mounting features for each of the different systems. Accordingly, there is a need in the art for an accessory mounting system that allows for interchangeable installation of various accessory systems having disparate load requirements.

SUMMARY

Various embodiments directed to a ditch cover assembly, an accessory attachment clip, and an interchangeable roof accessory system for a vehicle are disclosed herein. An exemplary assembly generally includes an elongated body having a first end, a second end, and a mid-portion disposed between the first and second ends, at least one securement mechanism disposed along the body for retaining an accessory, and at least one aperture disposed between the first end and the second end operable to receive a fastener to secure the body to the vehicle.

BRIEF DESCRIPTION OF THE DRAWINGS

While the claims are not limited to the illustrated embodiments, an appreciation of various aspects is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows.

DETAILED DESCRIPTION

Reference in the specification to 'one embodiment' or 'an embodiment' means that a particular feature, structure, or characteristic described in connection with the embodiment is included in at least one embodiment. The appearances of the phrase 'in one embodiment' in various places in the specification are not necessarily all referring to the same embodiment.

Figure 1:
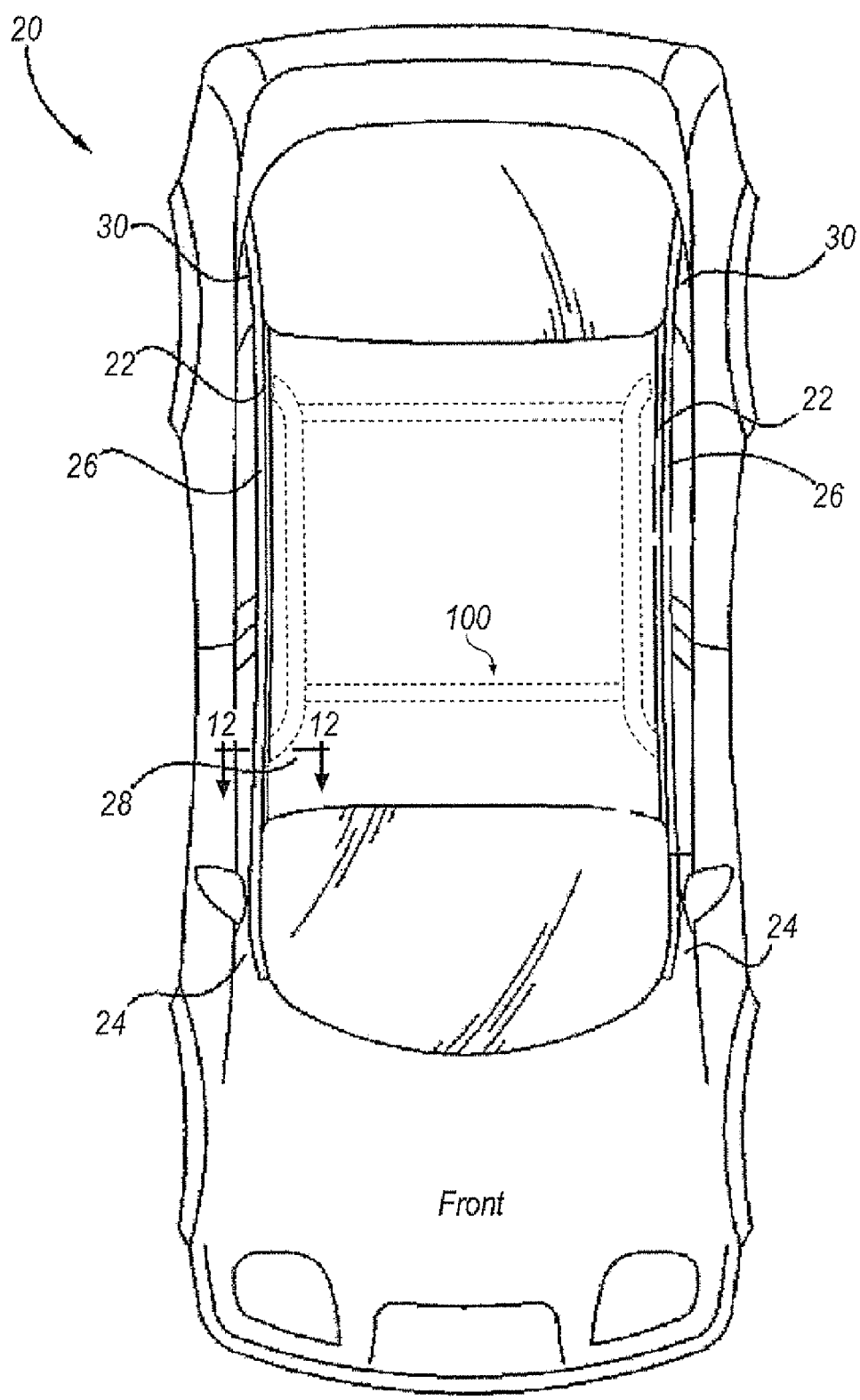
FIG. 1 is a plan view of a vehicle with a pair of roof ditch moldings secured to the vehicle.

Referring initially to FIG. 1, a vehicle 20 is shown with a pair of roof ditch moldings 22 that extend in a generally longitudinal direction along the left and right sides of vehicle 20. Left and right roof ditch moldings 22 may generally extend continuously from lower portions of left and right front pillars 24 along left and right side portions 26 of a roof exterior surfaces to lower portions of left and right rear pillars 30, respectively. More particularly, each of ditch moldings 22 include a roof molding section that extends generally longitudinally along the roof exterior surface 28 of the vehicle 20, a front pillar molding section integrally formed with the roof exterior surface 28 to extend generally parallel to the left or right front pillar 24, and a rear pillar molding section integrally formed with the roof exterior surface 28 to extend generally parallel to the left or right rear pillar 30. Each of ditch moldings 22 may be configured and arranged such that the roof exterior surface 28, the front pillar molding portion and the rear pillar molding portion of each of the ditch moldings 22 have a generally constant transverse cross sectional shape, as discussed in more detail below. As will be described further below, vehicle 20 may optionally have an accessory rack 100 installed along with ditch moldings 22.

Figure 2:
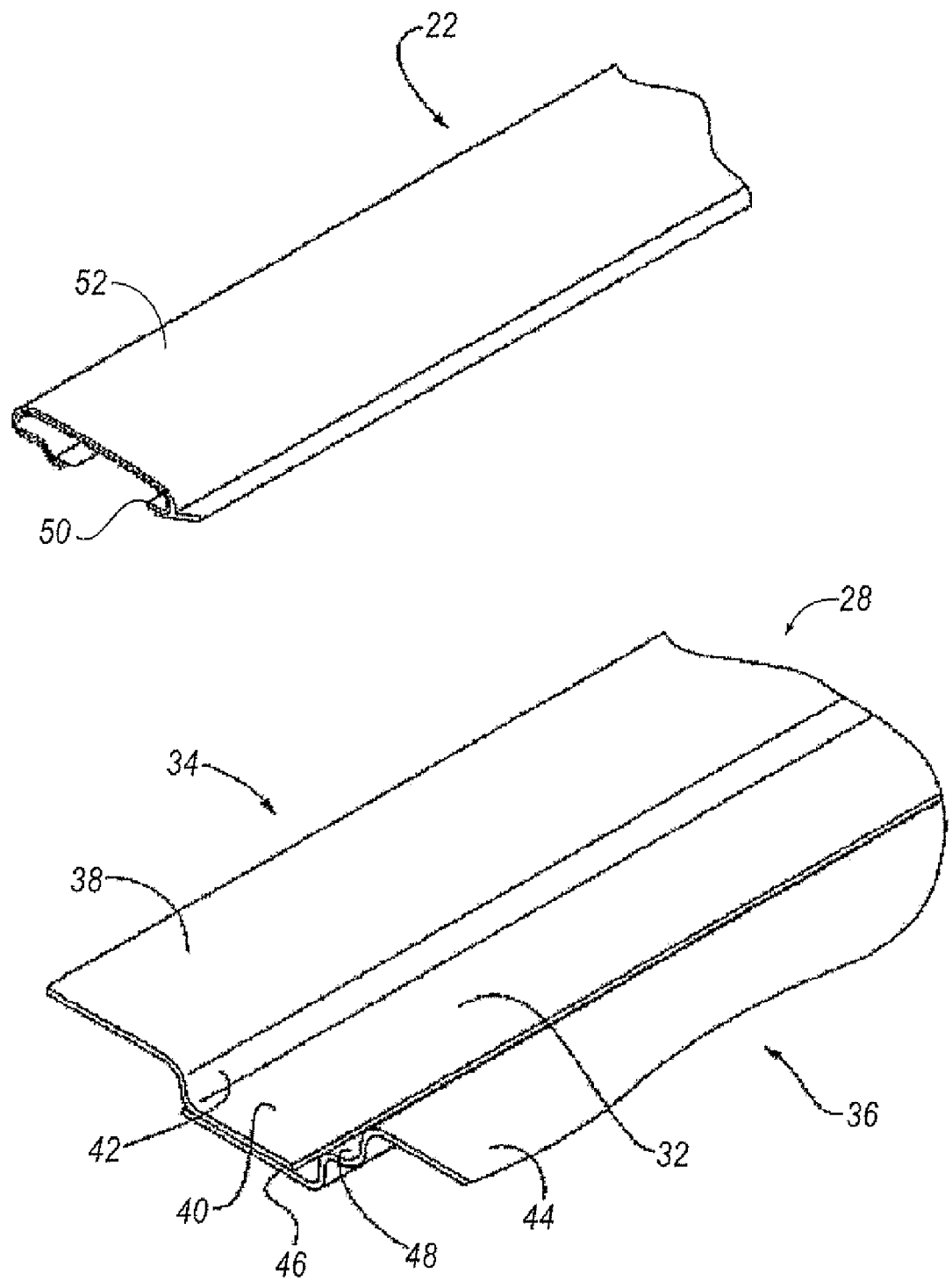
FIG. 2 is a partial left side elevational view of the vehicle illustrated in FIG. 1 showing locations in which the roof ditch molding is secured to the vehicle.
Figure 3:
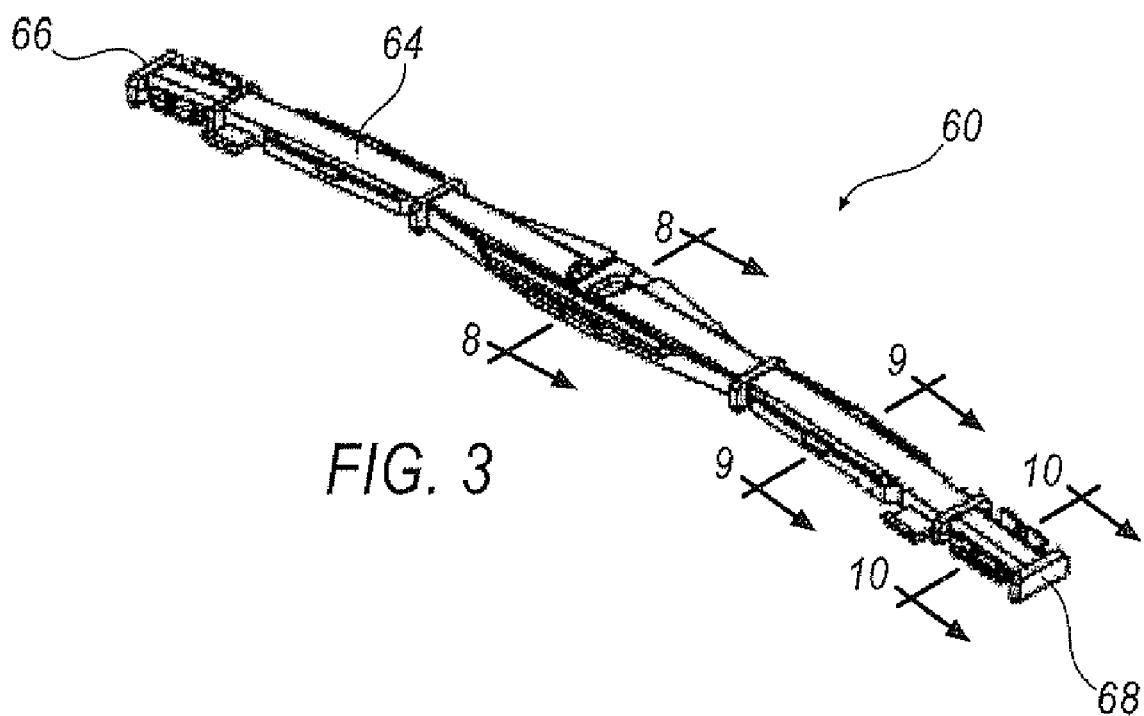
FIG. 3 is an elevated perspective view of an exemplary attachment clip.

As seen in FIG. 2, the ditch molding 22 is installed in a generally U-shaped drainage groove 32 that is formed in a longitudinal edge portion of the roof exterior surface 28 as discussed below. The right ditch molding 22 is installed in a generally U-shaped drainage groove 32 that is formed in a right longitudinal edge portion of the roof exterior surface 28 in the same manner as left roof ditch molding 22. Thus, the left roof ditch molding 22 will be illustrated herein.

Ditch molding 22 may be secured to vehicle 20 at a plurality of predetermined locations. More specifically, the roof molding section of ditch molding 22 may be secured to roof exterior surface 28 by a plurality of roof fasteners at a plurality of roof mounting locations (not shown). The front pillar molding section and the rear pillar molding section of the ditch molding 22 are secured to the front pillar 24 and the rear pillar 30, respectively (shown in FIG. 1), by a plurality of pillar fasteners at a plurality of front pillar mounting locations and a plurality of rear pillar mounting locations (not shown). One of skill in the art will generally recognize that the mounting locations are not limited to those specifically described herein, and that the precise number and locations of the mounting locations can be varied based on a particular vehicle configuration, and may even include vehicle locations not associated with a particular pillar.

Ditch molding 22 may be secured to any roof exterior surface 28 defining a groove or ditch. For example, roof exterior surface 28 may include a roof panel 34 that extends in a generally horizontal direction to form an outer roof surface of vehicle 20, and a side panel 36 that forms a side portion of vehicle 20. Roof panel 34 may be a rigid press-formed member, e.g., sheetmetal, that includes a roof main portion 38, a lateral roof edge portion 40, and a roof vertical portion 42 disposed therebetween. Roof edge portion 40 may be disposed outwardly with respect to the roof main portion 38 and extend in a generally longitudinal direction of the vehicle 20. Roof vertical portion 42 may extend in a generally vertical direction between the roof main portion 38 and the roof edge portion 40 so that the roof edge portion 40 is downwardly offset from the roof main portion 38. Further, roof vertical portion 42 may have any other general shape or configuration allowing a downward offset between roof main portion 38 and roof edge portion 40. For example, roof vertical portion 42 may be sloped between roof main portion 38 and roof edge portion 40.

Side panel 36 may be a rigid press-formed member, e.g., sheetmetal, which includes a side outer portion 44, a lateral side edge portion 46 and a side vertical portion 48 as seen in FIG. 2. Lateral side edge portion 46 may be disposed inwardly with respect to side outer portion 44 and extends in a generally longitudinal direction of vehicle 20. Side vertical portion 48 may extend in a generally vertical direction between side outer portion 44 and side edge portion 46 such that side edge portion 46 is downwardly offset from side outer portion 44. As with roof vertical portion 42, side vertical portion 48 may have any general shape or configuration allowing a downward offset between side outer portion 44 and side edge portion 46.

Roof panel 34 and side panel 36 may be secured together at the roof edge portion 40 of the roof panel 34 and the side edge portion 46 of the side panel 36 to form the generally U-shaped drainage groove 32 between the roof panel 34 and the side panel 36. Roof panel 34 and side panel 36 may be secured by any known method, e.g., welding. The drainage groove 32 may extend in a generally longitudinal direction at a lateral edge portion on the roof of the vehicle 20. More specifically, when the roof edge portion 40 and the side edge portion 46 are coupled together, roof vertical portion 42 and side vertical portion 48 conveniently form a pair of side walls of the U-shape drainage groove 32, and roof edge portion 40 and side edge portion 46 together form a bottom portion of the drainage groove 32. Ditch molding 22 may be secured within the drainage groove 32 in a transverse direction such that ditch molding 22 generally covers a coupling portion between roof edge portion 40 of roof panel 34 and side edge portion 46 of the side panel 36.

Virtually any other roof ditch formed in a roof of vehicle 20 may be employed, and drainage groove 32 need not be formed by separate panels such as roof panel 34 and side panel 36. For example, drainage groove 32 may be stamped into a single sheetmetal panel. Conveniently, use of a separate roof panel 34 and side panel 46 allows for a generally rigid roof structure that is commonly used in vehicle mass manufacturing environments.

Ditch molding 22 may include a rigid carrier member 50 and a resilient cover member 52. Carrier member 50 is preferably formed with a rigid material such as steel or aluminum to provide a desired stiffness of ditch molding 22 and control shrinkage of ditch molding 22 due to temperature changes. Carrier member 50 may extend for an entire length of the ditch molding 22 in a longitudinal direction relative to vehicle 20 (i.e., from the lower portion of the front pillar 24 along the roof exterior surface 28 to the lower portion of the rear pillar 30). Cover member 52 of the ditch molding 22 may be formed with a resilient material such as polyvinyl chloride (PVC) or the like to cover an outer surface of the carrier member 50.

Figure 8:
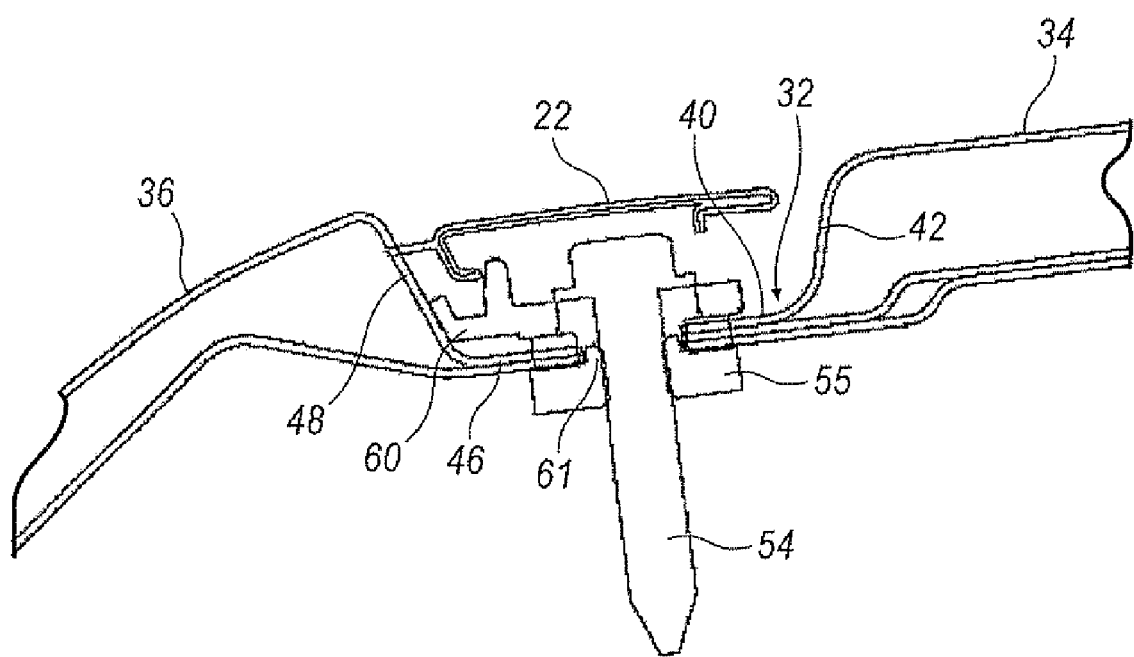
FIG. 8 is a cross-sectional view of the attachment clip of FIG. 3 taken along sectional line 8-8 in FIG. 3, showing a ditch molding secured to a vehicle outer surface.
Figure 9:
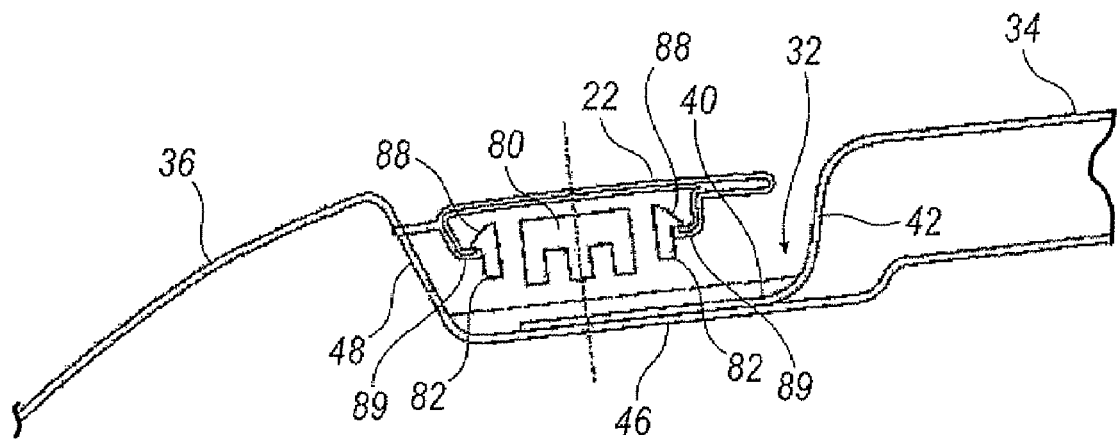
FIG. 9 is a cross-sectional view of an exemplary attachment clip, taken along sectional line 9-9 in FIG. 3 and FIG. 11, showing a ditch molding secured to a vehicle outer surface.
Figure 10:
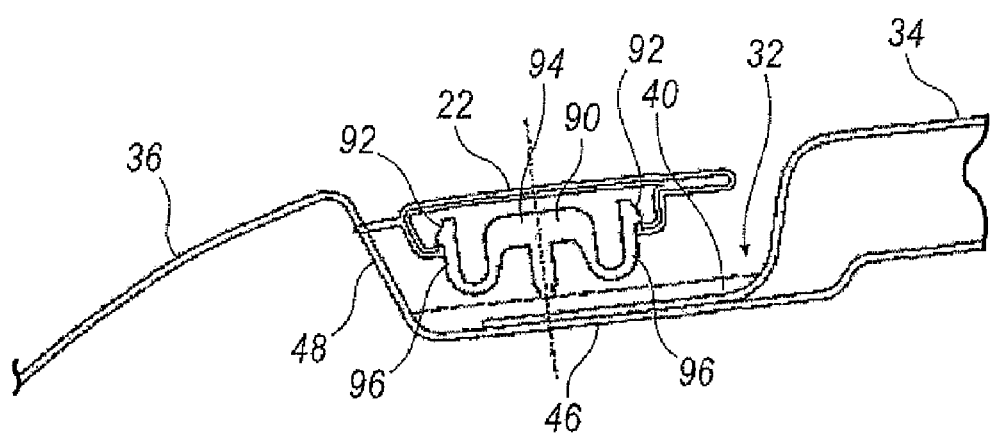
FIG. 10 is a cross-sectional view of the attachment clip of FIG. 3 taken along sectional line 10-10 in FIG. 3 showing a ditch molding secured to a vehicle outer surface.

As seen in FIGS. 8-10, ditch molding 22 may be secured within drainage groove 32 formed in the roof exterior surface 28 by one at least one attachment clip 60. Ditch molding 22 preferably generally conceals at least a portion of drainage groove 32, while allowing water to flow along drainage ditch 32. Accordingly, ditch molding 22 is preferably spaced from drainage ditch 32 to allow water to run into and flow along drainage ditch 32 from roof exterior surface 28. More specifically, ditch molding 22 is coupled to roof exterior surface 28 generally using a plurality of attachment clips 60 and fasteners 54. Fasteners 54 may extend through an aperture 62 in each of the attachment clips 60, which are generally aligned with a sheetmetal aperture 61 in drainage groove 32.

Figure 12:
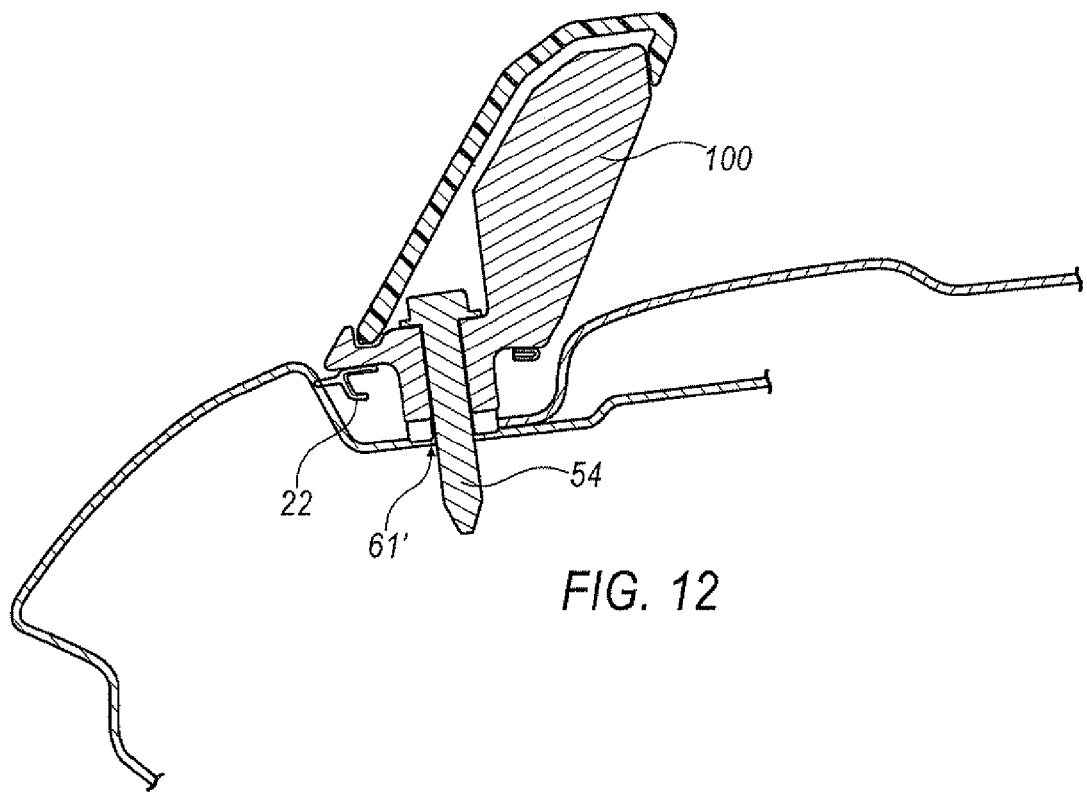
FIG. 12 is a cross-sectional view of the accessory rack of FIG. 1 taken along sectional line 12-12 in FIG. 1 showing a ditch molding secured with the accessory rack.

Fastener 54 may include any type of bolt, screw, or rivet, as examples, commonly employed for vehicle accessory attachment, e.g., an M6 self-tapping bolt that engages a weld nut 55 secured to the vehicle sheetmetal, as shown in FIG. 8. Further, fastener 54 may be a same type of fastener as that used for installation of accessory rack 100 in addition to ditch molding 22 on vehicle 20. The use of a common fastener 54 for securing either attachment clip 60 or an accessory rack (not shown) thus allows simplified manufacturing of a particular vehicle that may be offered with an accessory rack and a ditch molding, or, alternatively, a ditch molding alone. An accessory rack 100 may be installed to a sheetmetal aperture 61' provided at a different point along drainage groove 32, while a ditch molding 22 may be installed to an attachment clip 60, which is secured to sheetmetal aperture 61. For example, as shown in FIGS. 1 and 12, accessory rack 100 and ditch molding 22 may be secured to vehicle 20 with fastener 54 at apertures 61 and 61', which are arranged along a single drainage groove 32.

Figure 4:
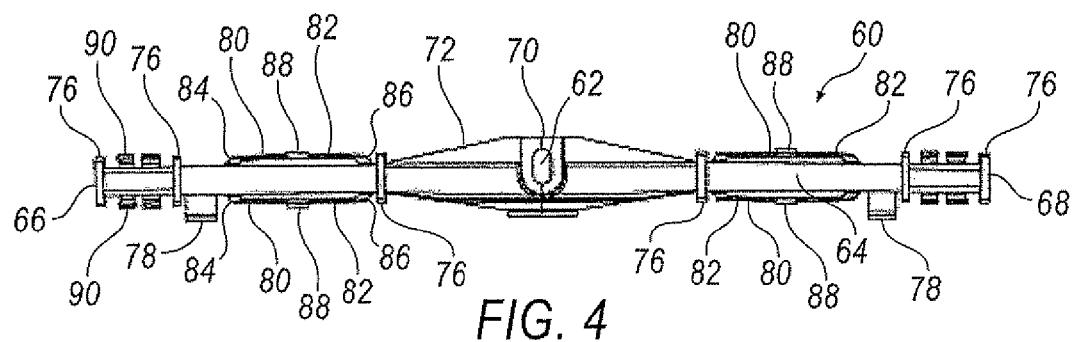
FIG. 4 is a top view of the attachment clip of FIG. 3.
Figure 5:
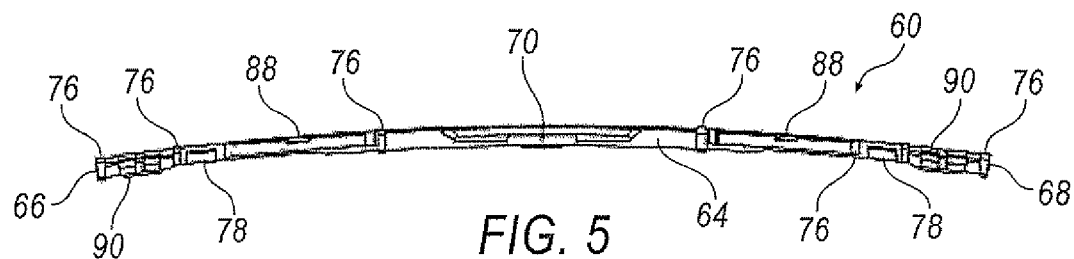
FIG. 5 is a side view of the attachment clip of FIG. 3.
Figure 6:
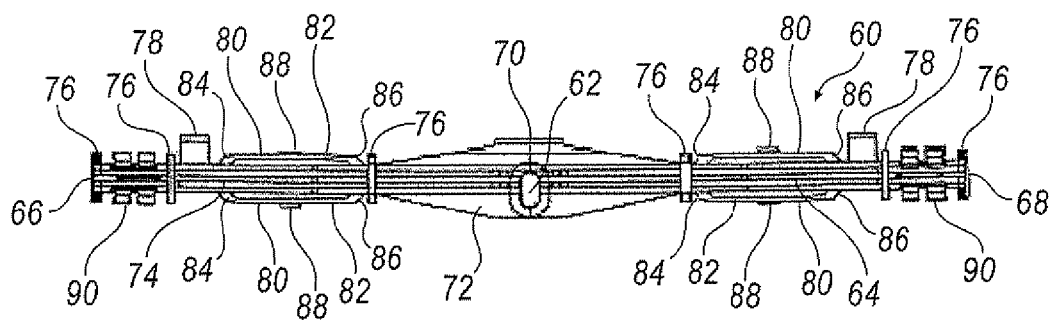
FIG. 6 is a bottom view of the attachment clip of FIG. 3.
Figure 7:
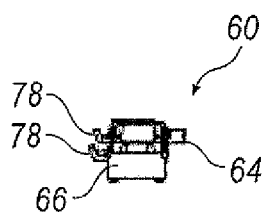
FIG. 7 is a front view of the attachment clip of FIG. 3.

Turning now to FIGS. 3-7, attachment clip 60 is described in further detail. Attachment clip 60 may be formed with any generally rigid material such as synthetic resin, plastic, aluminum, steel, and the like. The material may also be any glass-filled material that assists in stabilizing attachment clip 60 during exposure to extreme heat during summer and extreme cold during winter, particularly when the material is non-metallic. A glass-filled material may generally reduce expansion and contraction of attachment clip 60 during extreme heat and cold conditions, respectively, and further reduces brittleness of attachment clip 60 in extremely cold conditions. Attachment clip 60 generally includes a generally elongated body 64 that may define a bow-shape between a first end 66 and a second end 68. One or more apertures 62 may be provided anywhere along elongated body 64, e.g., adjacent uppermost portion 70, for securing attachment clip 60 to a vehicle. As best seen in FIG. 5, attachment clip 60 has a generally bowed shape when in a relaxed orientation, such that when attachment clip 60 is first placed in position for installation to vehicle 20, a uppermost portion 70 is generally spaced away from the corresponding vehicle surface, with first and second ends 66,68 contacting the vehicle. As a result, first and second ends 66, 68 are biased into the generally U-shaped drainage groove 32 when uppermost portion 70 is secured with a fastener 54 to the vehicle. Accordingly, as installation is completed, uppermost portion 70 is biased in a downward direction by the at least one fastener 54. A flange portion 72 may be disposed proximate the aperture 62 for providing additional surface area for fastener 54, and may be used as an alignment or locating member for placing attachment clip 60 in a predetermined position within drainage groove 32 for installation. Flange portion 72 can also provide additional stiffness to clip 60 so that the clip is not inadvertently damaged by the fastener 54 when in an operational position.

Attachment clip 60 preferably further includes a plurality of longitudinal ribs 74 and a plurality of lateral ribs 76. A combination of one or more of the biasing of attachment clip 60 resulting from the bow-shape, and provision of ribs 74, 76 conveniently provide attachment clip 60 with additional stability and strength and provide channel stiffening. These qualities are particularly helpful in increasing durability of attachment clip 60 and overall resistance to expansion and shrinkage of attachment clip 60, resulting in a consistent and reliable attachment. The elimination of the general bow-shape of attachment clip 60 helps lock first and second ends 66, 68 into position as attachment clip 60 is lengthened upon removal of the bow. Any number and size of ribs 74, 76 may be used to determine overall shape and stiffness characteristics of attachment clip 60.

Attachment clip 60 may further include a first alignment member 78 disposed proximate one or both of first and second ends 66, 68. First alignment member 78 preferably extends outwardly from a side of the body 64 to engage at least one surface of drainage groove 32, thereby controlling alignment of attachment clip 60 relative to drainage groove 32 for installation. Accordingly, first alignment member 78 generally assists in aligning the ditch molding 22 with the attachment clip 60.

The attachment clip 60 further includes at least one securement mechanism for securing ditch molding 22 to the attachment clip 60. Each securement mechanism may be formed with a rigid material, e.g., synthetic resin. Further, each securement mechanism may be formed from a same material as elongated body 64 of attachment clip 60, such that attachment clip 60 may be formed entirely of a single rigid material.

As best seen in FIGS. 4 and 9, an exemplary first securement mechanism 80 is shown disposed between aperture 62 and each of first and second ends 66, 68. First securement mechanism 80 includes at least two longitudinal members 82 fixed to the body 64 at a securement first end 84 and a securement second end 86. At least one securement tab 88 may be disposed on longitudinal members 82 between securement first end 84 and the securement second end 86. As best seen in FIG. 9, securement tab 88 may be generally sloped to allow engagement of securement tab 88 with a corresponding tab 89 provided in ditch molding 22. Various features of first securement mechanism 80 may be varied to modify an engagement force associated with installation and/or removal of ditch molding 22 to and from first securement mechanism 80. For example, a thickness of longitudinal members 82 may be increased, or a distance of longitudinal member 82 may be reduced, to generally increase an engagement force between ditch molding 22 and first securement mechanism 80. Further, increasing a thickness of longitudinal members 82 and/or reducing a distance of longitudinal members 82 will tend to increase a disengagement force required to remove ditch molding 22 from attachment clip 60, e.g., when longitudinal members are urged laterally toward elongated body 64, disengaging securement tab 88 from corresponding tab 89.

In FIGS. 4 and 10, a second securement mechanism 90 is shown having two generally outwardly extending tabs 92. Outwardly extending tabs 92 generally define a somewhat 'W' cross-section, as best seen in FIG. 10. The generally 'W' shape provides a biasing force in a direction extending outwardly toward the side surfaces of drainage groove 32 for securing outwardly extending tabs 92 to ditch molding 22. As seen in FIG. 10, second securement mechanism 90 has a generally W-shape cross-section that includes a base portion 94 and a molding retaining portion 96 integrally formed with the base portion 94 to extend in a generally outward direction from the base portion 94.

Figure 11:
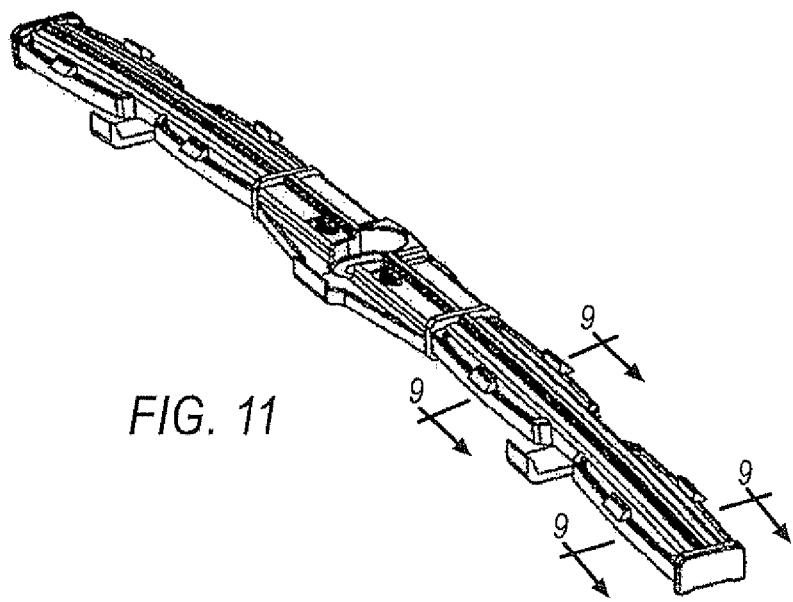
FIG. 11 is an elevated perspective view of an exemplary attachment clip.

The attachment clip 60 may include any combination and number of securement mechanisms that assist in securing ditch molding 22 to roof exterior surface 28. For example, as shown in FIGS. 3-7, attachment clip 60 may include two first securement mechanisms 80 spaced away from first and second ends 66, 68, and two second securement mechanisms 90, located between each of first securement mechanisms 80 and first and second ends 66, 68, respectively. Alternatively, as shown in FIG. 11, attachment clip 60 may include four first securement mechanisms 80, with two first securement mechanisms 80 disposed between aperture 62 and first and second ends 66, 68. Other combinations may be employed, depending on a desired configuration. First securement mechanism may generally provide a robust, durable connection between attachment clip 60 and ditch molding 22. In contrast, second securement mechanism 90 may provide a reduced engagement force during installation and/or removal of ditch molding 22 as compared with first securement mechanism 80. Accordingly, various features described above of securement mechanisms 80, 90, as well as an overall number and arrangement of securement mechanisms 80, 90 on attachment clip 60, may be varied according to particular requirements of an application for attachment clip 60.

Attachment clip 60 may further include an anti-rattle element (not shown) disposed between attachment clip 60 and ditch molding 22, for generally engaging both attachment clip 60 and ditch molding 22 and preventing rattling of ditch molding 22 relative to attachment clip 60. For example, a foam piece may be provided between attachment clip 60 and ditch molding 22 to generally absorb relative movement between attachment clip 60 and ditch molding 22. Further, an anti-rattle element may be formed as part of either ditch molding 22 or attachment clip 60, such as an extension arm that extends from one of ditch molding 22 or attachment clip 60 to engage the other of the ditch molding 22 or attachment clip 60.

Attachment clip 60 therefore provides a simple installation for a ditch molding 22 to any vehicle aperture 61. Alternatively, a vehicle 20 may be provided with a ditch molding 22 and an accessory rack 100, wherein ditch molding 22 is secured to an attachment clip 60 which is secured to aperture 61 within drainage groove 32, while accessory rack 100 is secured to another aperture 61' disposed within drainage groove 32. Further, accessory rack 100 may generally trap ditch molding 22 between vehicle 20 and accessory rack 100 adjacent aperture 61', thereby allowing for ditch molding 22 to be secured by attachment clip 60 and accessory rack 100. Further, attachment clip 60 provides a robust attachment for ditch molding 22 that allows for easy installation and later removal of ditch molding 22.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain approaches, examples or embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as 'a,' 'the,' 'said,' etc. should be read to recite one or more of the indicated elements unless a claim recites an explicit limitation to the contrary.

The invention claimed is:

1. A ditch cover assembly for a vehicle comprising: an attachment clip, including:
   an elongated body having a first end, a second end, and a mid-portion therebetween;
   at least one securement mechanism disposed along said body; and
   at least one aperture disposed between said first end and said second end, said aperture operable to receive a fastener to secure said body to the vehicle; and
   a ditch cover operable to be secured to said securement mechanism of said attachment clip, thereby securing said ditch cover to the vehicle.

2. The ditch cover assembly of claim 1, wherein said mid-portion of said elongated body is generally bow-shaped such that said first and second ends are biased against the vehicle when said elongated body is secured to the vehicle.

3. The ditch cover assembly of claim 1, wherein said body includes at least one longitudinal rib for increasing a longitudinal stiffness of said elongated body.

4. The ditch cover assembly of claim 1, wherein said body includes at least one lateral rib for increasing a lateral stiffness of said elongated body.

5. The ditch cover assembly of claim 1, wherein said body includes at least one locating member operable to engage a surface of the vehicle to align said elongated body with a groove defined by the surface.

6. The ditch cover assembly of claim 1, wherein said securement mechanism includes two longitudinal members fixed to said elongated body.

7. The ditch cover assembly of claim 6, wherein said longitudinal members are oriented generally parallel to said elongated body.

8. The ditch cover assembly of claim 6, wherein said longitudinal members include a tab for engaging the cover.

9. The ditch cover assembly of claim 1, wherein said securement mechanism includes two lateral members fixed to said elongated body, said lateral member extending away generally orthogonal to said elongated body to form a somewhat W-shaped section.

* * * * *